Aug. 14, 1934.    R. P. HEUER    1,969,751
REFRACTORY BRICK
Filed Dec. 5, 1930    2 Sheets-Sheet 1
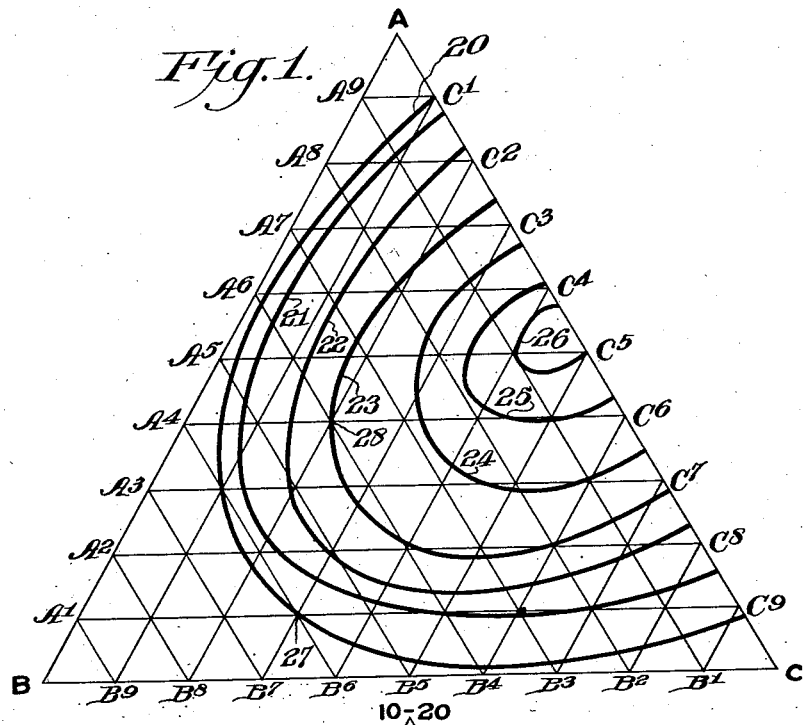
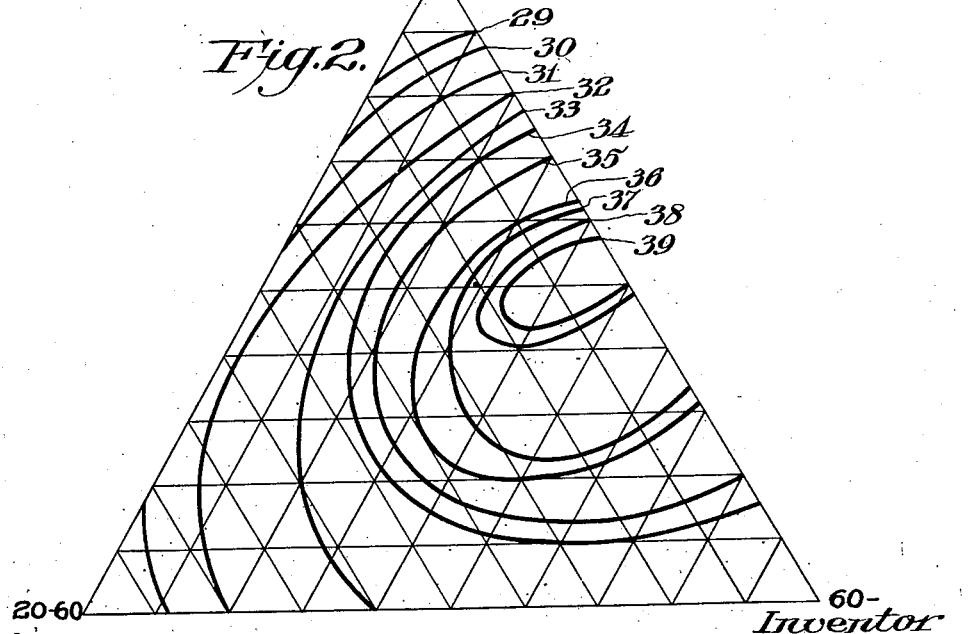
Inventor
Russell P. Heuer,

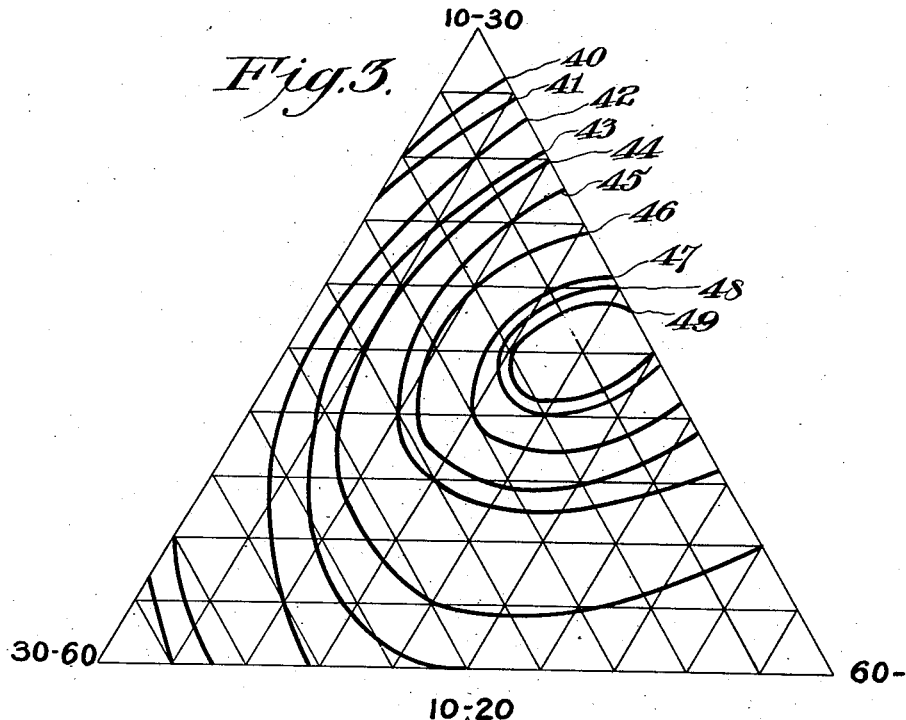
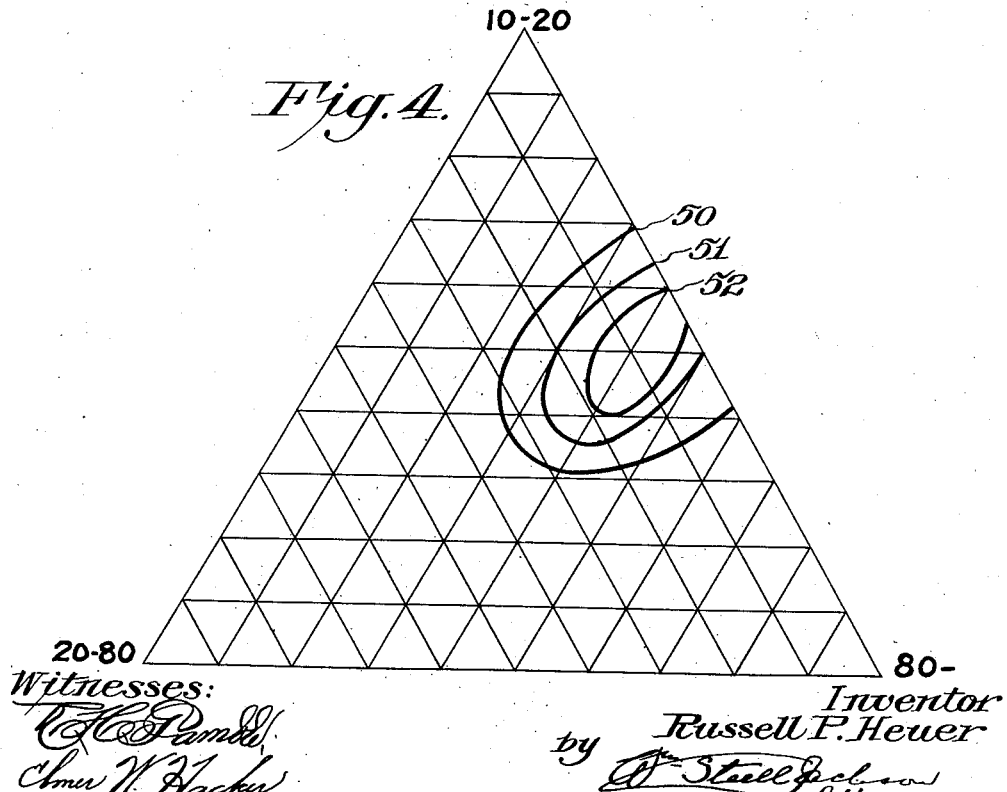

Patented Aug. 14, 1934

1,969,751

UNITED STATES PATENT OFFICE 1,969,751

REFRACTORY BRICK

Russell Pearce Heuer, Haverford, Pa., assignor to General Refractories Company, a corporation of Pennsylvania Application December 5, 1930, Serial No. 500,281

28 Claims. (Cl. 25—156)

My invention relates to improvements in silica brick and in the methods of manufacturing the same.

A purpose of my invention is to increase the density and strength and to improve the refractory properties of silica brick.

A further purpose is to manufacture silica brick from materials now unsuited to this use, desirably employing silica sand to replace quartzite rock or ganister.

A further purpose is to make silica brick of higher silica content than that which is obtained from raw materials available under the present methods of manufacture.

A further purpose is to fire silica brick without destruction of the initial interfitting of the particles and without increase in the percentage of interstitial void spaces during firing.

A further purpose is preliminarily to convert silica present as quartz into coalesced cristobalite and/or tridymite to obtain maximum particle growth, and to form the coalesced pregrown silica into unburned brick.

A further purpose is to vitrify silica containing quartz, to cool the vitrified silica sufficiently slowly to permit cristobalite and/or tridymite to crystallize out, and to make brick of the product.

A further purpose is to readjust the sizes and shapes of silica particles prior to forming into a brick, using means other than direct grinding.

A further purpose is preliminarily to heat silica containing quartz to accomplish growth by vitrification and crystallizing out of cristobalite and/or tridymite, and to grind the pregrown silica to suitable size and under proper grinding conditions to make silica brick of any desired character.

A further purpose is to use silica brick in furnace linings without previous firing.

A further purpose is to permit the advantageous application of high forming pressures to silica brick, whereas high pressures cannot be advantageously applied under present methods of manufacture.

A further purpose is to grade the sizes and control the proportions of various size bands of coalesced pregrown silica particles to obtain maximum density and volumetric stability when the particles are formed into brick and to gain the full advantage of increased forming pressures applied to the graded particles.

A further purpose is to mix coalesced pregrown silica particles with ungrown or uncoalesced silica particles for making brick.

A further purpose is to form silica brick from relatively coarse coalesced pregrown particles and relatively fine ungrown or uncoalesced particles.

Further purposes will appear in the specification and in the claims.

My invention relates both to the brick themselves and to the methods by which they are produced.

In the drawings I illustrate diagrammatically the principles of one feature of my invention.

Figures 1 to 4 are ternary diagrams showing the densities of bricks produced from graded particles, using varying percentages of different size bands.

In the drawings like numerals refer to like parts.

Background of the invention

Silica brick are very widely used in open hearth steel furnaces, in reverberatory copper smelting and refining furnaces, in coke ovens and in many other types of furnaces.

There are three well known crystallographic forms of silica. Quartz, which is stable at ordinary temperatures, has a specific gravity at 2.65 at 0° C. Cristobalite has a specific gravity of 2.32 at 0° C. and is stable from 1470° C. to 1710° C. Tridymite has a specific gravity at 2.26 at 0° C. and is stable from 870° C. to 1470° C.

Thus it is seen that quartz is much denser than either cristobalite or tridymite, and that cristobalite and tridymite have approximately the same densities.

When quartz changes to cristobalite or tridymite it increases in volume approximately 14%, based on comparisons at 0° C. Among refractory makers this increase due to the polymorphous transformation is known as "growth".

There is, furthermore, a noncrystalline form of silica known as vitreous silica, which has a specific gravity of 2.20 at 0° C.

Vitreous silica is formed from cristobalite above the melting point of cristobalite, 1710° C., from tridymite above 1670° C. and from quartz above approximately 1400° C.

Under the conditions of furnace use brick are subjected to abrasion, to compressive loads at high temperatures and to the actions of slags and other corrosive materials.

To meet these conditions, silica brick are at present made from quartzite rock or ganister, such as the Pennsylvania quartzite known as "Medina" and the Wisconsin quartzite known as "Baraboo".

A typical analysis of such ganister is as follows:—

| | Percent |
|---|---|
| Loss on ignition | 0.05 |
| Silica | 97.48 |
| Ferric oxide | 0.35 |
| Alumina | 1.41 |
| Lime | 0.39 |
| Magnesia | 0.25 |

Under the prior art, ganister is crushed, mixed with approximately 2% of lime and ground with water in wet pans until it will pass through a 4 millimeter opening. The ground material is formed into brick by hand or by machine, and the brick are dried and kiln fired up to 1500° C.

Rock quartzite or ganister is more expensive than other forms of silica material, but is the only silica mineral which will produce satisfactory brick under present conditions.

During firing, the quartzite, which composes the bulk of the unburned ganister, undergoes a polymorphous transformation to cristobalite and/or tridymite, accompanied by growth of about 14%. During forming of the brick the interfitting of the particles is established, but, due to growth, the particles readjust during firing and many of the particle contacts are changed or destroyed.

When growth occurs during firing there are two important results. The percentage of voids is greatly increased because the brick is not under pressure during firing, and does not merely expand 14% over all, but undergoes a 14% increase in volume in each individual particle, with accompanying loss in tightness of particle interfitting. After firing the percentage of void spaces in silica brick manufactured from ganister varies between 23% to 30%, depending upon several factors, such as the method of manufacture and the type of quartzite used.

Increase in the voids is not the only undesirable result of growth during firing. Many particle contacts are destroyed, and the particle contacts which remain after growth are not as intimate as those produced during forming. The sintering action taking place near the end of firing is thus less effective because there are fewer and less intimate particle contacts to sinter. As a result, the brick after firing are lacking in strength and resistance to abrasion.

A superficial analysis of the problem would suggest that this condition could be remedied by increase in forming pressures, to improve the interfitting of the particles prior to firing. I have experimented with ganister brick formed under very high pressures, and have observed that, contrary to expectation, brick formed under such pressures from ganister prepared in the ordinary manner are very little if any more dense after firing than brick formed under low pressures.

In other words, growth takes place just the same whether the brick are formed under high or low pressures, and destroys any intimate interfitting which is obtained under high pressures just as it destroys the interfitting obtained under low pressures. Increase of forming pressure alone is not the solution of the problem.

*Pregrowth*

I have discovered a method for making silica brick which are very dense and have high resistance to crushing pressures, abrasion and slag penetration at high temperatures. To accomplish this, I form the brick initially from dense silica particles of volumetric stability, so that no growth takes place after the brick are formed.

My invention contemplates effecting the polymorphous transformation of quartz into cristobalite and/or tridymite and coalescing the particles prior to forming them into brick.

I will first consider effecting the polymorphous transformation, and will later discuss coalescing.

Since, prior to forming, the particles have not been interfitted, growth at this preliminary stage can do no harm to the brick.

Growth prior to forming the brick is referred to by me as "pregrowth" throughout the specification and claims.

To pregrow the silica I heat it above the lower temperature at which cristobalite and/or tridymite are stable, and preferably to the condition of vitrification in order to coalesce the silica, as later explained.

By employing pregrown silica as a starting material for my brick, I am able to get a product which, after firing or heating in use, often has less than 18% of voids, and certainly less than 20% of voids, on the basis of the volume of the finished brick. This novel product is much more resistant to slag penetration than silica brick at present in use.

The particular method by which the polymorphous transformation is accomplished in the pregrowing step is very essential to my invention. If the particles be pregrown without coalescence, the product is friable and it will not produce a brick of high density. On the other hand, where the particles are coalesced as later explained, the resulting brick is very dense, whether it be fired after forming or used unfired.

I regard brick as "unfired" when it has not been fired, whether the intention is to fire it or to use it in a furnace without previous firing.

When a brick formed of pregrown coalesced silica is fired, its particles of course change in volume slightly due to expansion during heating, but no substantial permanent volume change occurs. If a brick formed of only partially pregrown silica be fired, growth will be completed in firing, but even then the undesirable effects of growth will be much less pronounced than where the brick prior to firing was entirely ungrown.

It will then be evident that part of the advantage of my invention may be gained by using as a silica brick starting material a mixture of pregrown coalesced particles and ungrown particles.

The use of ungrown silica along with pregrown coalesced silica in the same brick, while it produces better brick than those now made, produces brick so much less desirable than those made from entirely pregrown coalesced silica that I do not recommend it except as a means of reducing the cost of manufacture by avoiding pregrowing of part of the silica.

Where brick are to be made from partially grown silica, I prefer to employ more than 50% of pregrown coalesced silica in the batch, so that the undesirable effect of growth during firing will be less pronounced.

Another way of suppressing the undesirable effect of growth of the ungrown silica is to use relatively fine particles of ungrown silica mixed with relatively coarse particles of pregrown coalesced silica. Then, when the fine particles grow during firing or during furnace use, the interfitting is not completely disrupted. For best results the ungrown particles should pass through a screen having 50 mesh per linear inch (388.1 mesh per square centimeter) or smaller. A given percentage of ungrown silica does less harm when it is present as fine particles than when it is present as coarse particles.

I may also mix the pregrown coalesced silica with pregrown uncoalesced silica, preferably making the uncoalesced particles relatively fine in size. I do not recommend this either, except for cheapness.

*Coalescence*

Pregrowing serves to prevent excessive permanent increase in volume during firing or during heating in use, by bringing about the polymorphous transformation, and to that extent it increases the ultimate density of the brick.

However, it does not secure high density of the particles themselves. This I obtain by coalescing the particles desirably during pregrowing, although permissibly in a separate step.

When I say that pregrowing and coalescence produce silica of high density it will be understood, of course, that the specific gravity of pregrown coalesced silica is not as high as that of quartz, but quartz cannot be present for any extended time in silica which is subjected to high temperature. Coalesced pregrown silica is denser than pregrown silica which has not been coalesced, due to the decrease of per cent of voids in the individual particles. Vitrified crystallized silica is still denser than unvitrified crystallized silica, because of the close grain structure (decrease in porosity) due to vitrification.

In view of the fact that quartz is the form of silica having the highest specific gravity, and my brick, being of cristobalite and/or tridymite, is of course of lower specific gravity, but is of relatively low porosity compared to cristobalite and/or tridymite which have not been coalesced, I speak of my brick as having high "permissible density", since the high specific gravity due to quartz is impossible in a material which must be subjected to high temperatures.

At high temperatures silica becomes substantially liquid, producing the vitreous form. Ordinary ganister, while it occurs in massive form, really consists of small grains of silica which are cemented together by siliceous cement. When such ganister is heated to transform the quartz into cristobalite and/or tridymite, without coalescence, a shattering of the siliceous cement takes place and the resultant calcine is weak and porous.

Since I desire a particularly hard and dense pregrown silica, and for other reasons as later explained, I heat the silica to coalesce the grains and to produce vitreous silica. The formation of the liquid phase eliminates much of the porosity of the silica particles.

When vitreous silica is carried below its solidification point it has the appearance of glass, and remains amorphous after rapid cooling even down to room temperatures. I will, however, maintain the vitreous silica at a temperature slightly below its solidification point to cause cristobalite and/or tridymite to crystallize out, thus completing growth.

Crystallization of vitreous silica could also be accomplished by cooling the silica quickly after vitrification and then reheating to crystallize the silica.

The operation of vitrification and coalescence causes the individual grains of silica which compose the ganister mass, or which compose silica sand where that material is treated, to unite by the formation of liquid silica. The resultant product is strong and dense and does not depend on any initial siliceous cementing material for its properties.

Though coalescence most usually takes place because of vitrification, there is a stage of heating below vitrification at which coalescence takes place by reason of the temperature effect upon the siliceous bonding material before the silica itself has been vitrified. This should be distinguished from ordinary sintering, where particle to particle contacts are established.

Pregrown silica is essentially crystalline, since it must contain cristobalite and/or tridymite. If the silica be vitrified and also pregrown, it will be understood that it has been crystallized after vitrification, but that it is characterized by the dense grain due to vitrification.

In the prior art, quartz is ground and then formed into brick. By my invention I may pregrow and coalesce the quartz as an initial step without prior grinding, then grind the vitreous or clinkered mass and subsequently form. In this instance, as in the prior art, only one grinding is necessary.

However, there is an important difference between the character of the ground product from my method as compared with that of the prior art, aside from the question of growth. The silica is aggregated into large pieces by pregrowing and coalescing, so that the ultimate particle size is within the control of the brick maker, who can vary the character and extent of grinding as he may wish. In the prior art, however, the brick maker must start with silica in the natural condition, and is limited to using the particles in the size in which they come to him, making them smaller, or discarding them. I may, on the other hand, increase the particle size. This feature of my invention is particularly applicable to silica sand.

There is a further very advantageous aspect of my invention. As previously noted, the prior practice has been to make silica brick from quartzite rock or ganister, in spite of the fact that many cheaper and purer silica minerals are available. The reason for restricting the raw material to rock quartzite is that after grinding the rock quartzite particles are irregular and interfit tightly when formed into brick.

Ordinary quartz sand or "glass" sand consists of eroded particles which are smooth rather than irregular, and do not interfit. Also, quartz sand contains too many fine particles to make a good brick, as explained more in detail later.

However, if quartz sand be vitrified, it melts together into an igneous mass, destroying the individuality of the particles, so that the sizes and shapes of the raw silica particles are not preserved in the vitrified mass. After crystallization of the vitrified product and grinding, I obtain pregrown coalesced particles which are just as desirably shaped for making silica brick as those produced from ganister. They are suitably irregular and the percentage of fines may be controlled by the conditions and extent of grinding. In addition, their porosity is less than that of ganister.

Silica sand is better than rock quartzite or ganister for a further reason. It is widely distributed and can be very cheaply mined. Purification may be accomplished by washing. On the basis of the material used in forming the brick, rock quartzite contains about 97.5% of silica, while silica sand has a silica content of from 98.5% to 99.5%. A decrease of 1% to 2% in the content of impurity in the silica brick is very important in improving the resistance of the furnace lining to slags.

It will be evident that my invention is applicable to any mineral containing silica as quartz without regard to its geological origin or physical condition. If it be of proper particle size and shape I may simply cause it to undergo a polymorphous transformation, although I will preferably also coalesce it, while if it be of improper particle size or shape or too porous or unsuitable for any other reason, I may vitrify and recrystallize it and then grind it to the condition which I desire.

It is important to distinguish the pregrowing step of my invention, which causes a polymorphous transformation in the silica, from preliminary calcining steps which are applied to other minerals before forming them into brick. The crystallographic behavior of silica is so distinctive that no analogies can be drawn between between the production of a polymorphous transformation in silica and the production of other crystallographic changes, as, for example, crystal growth or solid solution, which take place in other refractories.

It is also well to distinguish my pregrowing step from preliminary calcining steps applied to other refractories to bring about chemical changes, as, for example, calcining carbonates to remove carbon dioxide or heating hydrated minerals to drive off water of crystallization.

Forming pressure

As previously explained, the application of high forming pressure to ungrown quartz is of little or no advantage because the growth of the quartz during firing or during heating in use damages or destroys the interfitting of the particles, whether the forming pressure was high or low.

Where, however, the material operated upon is pregrown coalesced silica, there is no destruction of the particle interfitting by subsequent growth during firing or heating in use. Under these conditions, high forming pressures and special forming cycles are highly advantageous.

Thus it is seen that there is a real combination between the type of forming pressure and forming cycle employed and the character of silica which is operated upon, since, if the silica be ungrown, high forming pressures and special pressure cycles are of no advantage, while, if it be pregrown and coalesced, they are highly desirable.

I find that forming pressures of 2000 pounds per square inch (140.6 kilograms per square centimeter) and preferably greater pressures, up to as much as 10,000 pounds per square inch (703.1 kilograms per square centimeter) or more, are highly advantageous when applied to pregrown coalesced silica particles, since they cause tight interfitting of the particles and this tight interfitting is maintained throughout the subsequent firing or heating.

The brick batch is preferably moistened before forming.

Aside from the degree of pressure, the cycle of pressure application is important. While it is entirely permissible to build up rapidly to substantial maximum pressure, I find it very desirable to maintain the substantial maximum pressure for an appreciable time before decreasing the pressure.

This produces a sustained period or dwell at maximum pressure which permits elimination of entrapped air from the interstices between the particles, the establishment of equilibrium in the interfitting of the particles, and the elimination of fissures. The dwell need not be maintained until complete equilibrium is established in the brick under pressure. It is sufficient that some approach to equilibrium be reached.

I do not intend to claim in this application the pressure cycle described except as applied to pregrown silica particles.

The use of a dwell is highly advantageous in combination with operation upon pregrown coalesced silica because the dwell makes possible close interfitting of the particles and pregrowth prevents the destruction of the interfitting during firing or during heating in use.

I thus secure stabilization of the interfitted product such as I believe has never previously been approached in silica brick.

Grading of particles

In forming brick from pregrown coalesced silica, great advantage may be gained by grading the sizes of the particles which are to go into the brick and combining the graded sizes in proportions determined by studies made by me, notwithstanding that pregrown coalesced silica is desirable whether or not the sizes are graded.

While the grading of sizes and the combining of size bands is advantageous even when applied to ungrown ganister, part of the advantage is lost in that case by growth of the particles during firing or during heating in use. Where, however, grading of sizes and combining of size bands are applied to partially or wholly pregrown coalesced silica particles, the full advantage of grading and combining is made available for the first time in silica brick, because none of the interfitting due to grading and combining is damaged by growth, and because the particles themselves are very dense.

In the drawings I illustrate ternary diagrams showing the effects of various graded size bands upon the density of silica brick.

Considering the generic diagram shown in Figure 1, various mixes of three different consecutive size zones or bands of graded particles of silica are shown, mixed together in different proportions. I have discovered that the density of the mix is dependent upon the relative quantities of the different graded sizes of particles of which the mix is made. The curves are contour curves, as it were, showing loci of equal density of brick plotted upon the ternary diagram and indicating the effect of various relative quantities of the different zones or bands of graded sizes of silica particles.

I have found that the most perfect interfitting possible is dependent upon the substantial suppression of an intermediate size of particles.

The three components A, B and C, as indicated in Figure 1, consist respectively of consecutive size bands used in my tests. While in each test I have used particular size bands, my invention is independent of the size bands which are used.

The component A is made up of particles which pass through a screen which excludes particles too large for desirable use in a brick and which rest upon a screen of mesh size $a$. The component B is made up of particles which are small enough to pass through a screen $a$ and are large enough to rest upon a screen $b$. The component C comprises those sizes which will pass through a screen $b$. In the diagram the proportion of the component A is indicated by the perpendicular distance of any point in question from the line BC, and, for convenience, the lines A', A², A³, A⁴, A⁵, A⁶, A⁷, A⁸, and A⁹ have been drawn parallel with the line BC to indicate percentages of component A from 10% to 90%.

Correspondingly the percentages of the component B are represented by the perpendicular distances from the line AC, and, for convenience in indicating these percentages, lines B' to B⁹ have been drawn parallel to the line AC to show percentages of the component B from 10% to 90%.

In the same way the quantity of the component C is indicated by the perpendicular distance from the line AB and the lines C' to C⁹ have been drawn parallel to the line AB to indicate percentages of the component C from 10% to 90%.

At any point within the diagram the sum of the components A, B and C equal 100%.

According to the above explanation and as a result of tests, isodensity curves 20, 21, 22, 23, 24, 25 and 26 have been drawn, each as the loci of mixtures of the different components A, B and C, which respectively have the same density. The curves are numbered beginning with that of lowest density and proceeding to that of highest density.

It will also appear that for curves of lower densities such as 20, the variety of different mixtures is much greater than for curves of higher densities, such as 25 and 26. Brick mixes of proportions indicated by location in the area between the curve 26 and the line AC are of very high density.

In order that the application of the subsequent curves may be clear, I will first give applications upon the generic curve shown in Figure 1. For example, a refractory mix designated by location at the point 27 on curve 20 will have 10% of component A, 60% of component B and 30% of component C, while a refractory located at the point 28 on curve 23 will have 40% of A, 40% of B and 20% of C.

Though the diagram of Figure 1 gives a good idea of the general principles, I have included three other diagrams which are specific to ganister and show the density of mix secured from various size bands of ganister, illustrating the similarity of the specific curves to the general curve.

In Figure 2 the larger or A particles of ganister are such as pass through a screen having 10 mesh per linear inch (15.2 mesh per square centimeter) and rest upon a screen having 20 mesh per linear inch (62.4 mesh per square centimeter). The intermediate or B band of particles comprises those which pass through a screen having 20 mesh per linear inch (62.4 mesh per square centimeter) and rest upon a screen having 60 mesh per linear inch (557.0 mesh per square centimeter). The C particles are those which pass through a screen having 60 mesh per linear inch (557.0 mesh per square centimeter).

The isodensity curves 29 to 39 inclusive respectively show equal density ganister mixes of progressively greater density. It will be noted that as the percentage of B particles decreases the density of the mixture increases.

Figure 3 shows a ternary diagram for ganister in which the A particles pass through a screen having 10 mesh per linear inch (15.2 mesh per square centimeter) and rest upon a screen having 30 mesh per linear inch (138.5 mesh per square centimeter). The B particles pass through a screen having 30 mesh per linear inch (138.5 mesh per square centimeter) and rest upon a screen having 60 mesh per linear inch (557.0 mesh per square centimeter), while the C particles pass through a screen having 60 mesh per linear inch (557.0 mesh per square centimeter).

Curves 40 to 49 inclusive are isodensity curves indicating progressively increasing densities as the B particles are reduced toward the zero line of B particles.

Figure 4 is a ternary diagram in which the A particles of ganister pass through a screen having 10 mesh per linear inch (15.2 mesh per square centimeter) and rest upon a screen having 20 mesh per linear inch (62.4 mesh per square centimeter). The B particles pass through a screen having 20 mesh per linear inch (62.4 mesh per square centimeter) and rest upon a screen having 80 mesh per linear inch (992.2 mesh per square centimeter), while the C particles pass through a screen having 80 mesh per linear inch (992.2 mesh per square centimeter).

Curves 50 to 52 inclusive are isodensity curves of progressively increasing densities as the percentage of B particles is reduced.

Inspection of the diagrams of Figures 2, 3 and 4 indicates that the limits of the size bands are of relatively little importance, since in any case the mix of maximum density has substantially the same percentages of A and C particles.

The A particles should preferably range between 10 and 20 mesh per linear inch (15.2 and 62.4 mesh per square centimeter), although a range between 10 and 30 mesh per linear inch (15.2 and 138.5 mesh per square centimeter) is not undesirable. The fine particles should pass through a screen having 60 or 80 mesh per linear inch (557.0 or 992.2 mesh per square centimeter) or finer to get the best results. Fine grinding is expensive, however, and I find that the size of the fine screen may be 50 mesh per linear inch (388.1 mesh per square centimeter) without seriously affecting the quality of the brick.

It is evident that the densest brick is formed from a mix having proportions indicated by location in the area between a curve of high density and the zero line for B particles. The mix which I preferably use consists of approximately 55% of A particles and approximately 45% of C particles without substantial quantities of B particles. It will be understood that advantage may be obtained from my invention without necessarily eliminating the B particles, providing they be maintained unnaturally low. The larger and smaller particles, while preferably used in the proportions of 55% of larger and 45% of smaller by weight, may vary between 40% and 60% by weight of each in the permissible practice of my invention.

In this application I do not intend to claim broadly the use of particles graded according to the principles shown upon the ternary diagrams, but I wish to claim the features of grading which especially cooperate with pregrowing and coalescing of silica particles. Where a graded mix is made of ungrown silica, the density of the product, while higher than that made from other ungrown silica mixes, is not as high as that of brick produced by grading pregrown particles, nor as high as that produced by grading pregrown coalesced particles. The ungrown particles during growth destroy the interfitting in spite of the fact that the particle size bands have been combined to obtain maximum density. The effectiveness of the size grading and combining is to a certain extent defeated by use of ungrown particles.

Where, however, the graded particles have been pregrown, size grading and combining are fully effective to obtain maximum density without any destruction of interfitting due to particle growth. Size grading of silica particles is of especial and unusual advantage where the particles have been pregrown and also where the particles have been coalesced.

I much prefer high pressures for the pressing operation, since they more thoroughly interfit the particles than is possible with lower pressures.

It will be evident that the five factors, pregrowth, coalescence, high pressure, dwell in pressure and particle grading and combining cooperate to produce a quality of brick which could not be attained without all together and which could not be approached without the cooperation of several factors. This is true notwithstanding that any one of these means produces brick whose quality is much superior to that of the prior art.

*Firing*

Under one method according to my invention, the suitably formed brick, consisting partly or wholly of pregrown coalesced particles, is fired preferably in a fuel fired kiln at approximately 1475 to 1500° C. Since the growth is already partly or wholly completed, depending upon whether the brick is formed of partly or entirely pregrown particles, the volume change during firing is much less than that in ungrown silica. As a result, firing does not have the undesirable effect upon the brick which it has had in the prior art.

Prior to forming the brick, I will preferably add about 2% of lime as a bonding material. Instead of lime, I may add small quantities of magnesia, iron oxide, or clay as bonding materials, or even dispense with bonding materials under some conditions.

My invention also makes possible the use of brick which have not been fired at all previous to use in a furnace, but which rely on heat conducted to the furnace lining from the fuel or charge to accomplish the sintering of the particles.

I have discovered that suitably bonded brick formed from pregrown coalesced silica have sufficient mechanical strength prior to firing to resist shock during transportation and to sustain compressive loads encountered in the furnace wall until the brick become properly sintered.

By avoiding firing the expense of firing and the danger of destruction of the brick during firing are entirely eliminated, and instead the brick are merely dried after forming (as they are now dried preparatory to firing) and placed in a furnace lining. The heat of the furnace does the rest.

Since the silica is partly or entirely pregrown, there is little or no change in the particle structure during sintering. High forming pressure, pressure dwell and suitable grading of particles assist in producing a dense and firm brick which will resist shock and stress prior to sintering.

With the use of high forming pressures and graded particle size upon pregrown coalesced silica I can obtain a well bonded brick by using as little as 2% of sodium silicate as a bonding material. I then dry the brick to remove the excess of water and to develop the bond.

Unfired brick thus bonded, put into a furnace lining subjected to high temperatures, give satisfactory results by comparison with ordinary brick bonded with lime and fired. This is due to the advantage of pregrown coalesced silica and the low percentage of sodium silicate required.

Unfired brick prepared from silica sand after coalescence and used directly in furnace linings without firing are particularly desirable because the silica content of the brick after heating in the furnace lining exceeds 98.5%.

Thus the brick, even though it be unfired when placed in the furnace lining, is heated to firing temperature in the furnace, and I intend by this expression to include both heating during firing in a kiln and heating during use in a furnace lining.

It will be evident that the time sequence of the pregrowing and coalescing steps is not controlling in my invention, and that coalescing may precede or follow pregrowing, although pregrowing and coalescing will ordinarily be concurrent and the result of the same heating. When I refer in the claims to pregrowing and coalescing, it will be understood that I do not limit myself to coalescing which is previous to, subsequent to, or concurrent with the pregrowing.

I believe that I am the first to employ pregrown coalesced silica as a major constituent in brick and the first to use pregrown silica to give volumetric stability to brick.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:—

1. The method of making silica brick of high density, which consists in vitrifying the silica, in crystallizing the vitrified silica and in subsequently forming the silica into brick.

2. The method of making a starting material for silica brick, which consists in vitrifying the silica, in slowly cooling the vitrified mass to crystallize it and in grinding the product.

3. The method of making silica brick of high permissible density, which consists in vitrifying the silica, in crystallizing the silica, in grinding it and in forming into brick a mass of particles including as a predominant constituent crystallized particles.

4. The method of making silica brick of high permissible density, which consists in vitrifying the silica, in cooling the vitrified silica sufficiently slowly to crystallize it during cooling and in subsequently forming the silica into brick.

5. The method of making silica brick of high permissible density, which consists in vitrifying the silica, in cooling the vitrified silica sufficiently slowly to crystallize it during cooling, in grinding the silica and in subsequently forming into brick a mass of particles including as a predominant constituent crystallized particles.

6. The method of making silica brick of high permissible density, which consists in vitrifying the silica, in cooling the vitrified silica sufficiently slowly to crystallize it during cooling, in subsequently forming a mass of silica particles including crystallized particles into brick and in firing the brick.

7. The method of making silica brick of high permissible density for use in initial unfired condition in a furnace structure, which consists in vitrifying the silica, in cooling the vitrified silica sufficiently slowly to crystallize it during cooling, in grinding the silica, in subsequently forming a mass of particles including crystallized particles into brick, in placing the brick in a furnace structure in unfired condition and in subjecting the brick to firing temperature in place in the furnace structure.

8. The method of readjusting the particle sizes or shapes of silica minerals for use in refractories, which consists in vitrifying the silica, in crystallizing the vitrified silica and in subsequently grinding the crystallized silica into particles of different characteristics from those of the original particles.

9. The method of making silica brick for use in initial unfired condition in a furnace structure, which consists in vitrifying the silica, in crystallizing the vitrified silica, in grinding the crystallized silica into particles of different characteristics from those of the original particles, in forming into brick a mass of particles including crystallized particles, in placing the brick in a furnace structure in unfired condition and in subjecting the brick to firing temperature in place in the furnace structure.

10. The method of making silica brick from silica particles unsuited by size or shape for brick manufacture, which consists in vitrifying the silica, in crystallizing the vitrified silica, in grinding the crystallized silica to proper size and shape for brick manufacture and in forming the ground particles into brick.

11. The method of making silica brick from quartz sand, which comprises vitrifying the sand, crystallizing the vitrified silica, grinding the crystallized product and forming the particles into brick.

12. The method of making a starting material for silica brick from fine quartz such as glass sand, which is too fine for normal brick manufacture, which consists in vitrifying the quartz, in crystallizing the vitrified mass and in grinding the crystallized silica into particles large enough for convenient use in manufacturing brick.

13. The method of producing silica particles of irregular shape from quartz sand, which consists in vitrifying the sand, in crystallizing the vitrified sand and in grinding the crystallized mass under conditions proper to produce particles of irregular shape.

14. As an intermediate material in the manufacture of silica brick, vitrified crystallized silica.

15. As an intermediate material in the manufacture of silica brick, vitrified crystallized quartzite rock.

16. As an intermediate material for making silica brick, vitrified crystallized silica sand.

17. A silica brick containing vitrified crystallized quartz sand.

18. An unfired silica brick made from a finely divided silica mineral containing vitrified crystalized particles of larger size than the original particles of the mineral from which the brick was made.

19. An unfired silica brick containing vitrified crystallized particles of irregular shape formed of silica sand having particles of regular shape.

20. A silica brick in unfired condition having the preponderant part of its silica in the form of vitrified crystallized silica.

21. A silica brick comprising vitrified crystallized larger silica particles between 10 and 30 mesh per linear inch and vitrified crystallized smaller silica particles capable of passing 50 mesh per linear inch, each in the proportions of between 40% and 60% by weight.

22. A silica brick in unfired condition containing the preponderant part of its silica as vitrified crystallized silica and comprising larger particles above 30 mesh per linear inch and smaller particles capable of passing through 50 mesh per linear inch, each in the proportions of between 40% and 60% by weight.

23. The method of making silica brick of high permissible density, which consists in vitrifying the silica, in crystallizing the vitrified silica, in grinding the crystallized silica, in mixing between 40% and 60% by weight of crystallized silica larger than 30 mesh per linear inch with between 60% to 40% by weight of silica capable of passing 60 mesh per linear inch, and in forming brick of the mix.

24. The method of making silica brick of high permissible density, which consists in vitrifying the silica, in cooling the vitrified silica sufficiently slowly to crystallize it during cooling, in grinding the crystallized silica, in mixing between 40% and 60% by weight of crystallized particles between 10 and 30 mesh per linear inch with between 60% and 40% by weight of silica particles capable of passing 50 mesh per linear inch, in forming the mix into brick, in placing the brick in a furnace structure in unfired condition and in subjecting the brick to firing temperature in place in the furnace structure.

25. The method of making silica brick of high permissible density, which consists in vitrifying the silica, in cooling the vitrified silica sufficiently slowly to crystallize it, in grinding the crystallized silica, in mixing the crystallized particles with a binder and subsequently forming into brick.

26. A silica brick in unfired condition, containing at least 50% of vitrified crystallized silica and less than 2% by weight of sodium silicate, comprising larger silica particles between 10 and 30 mesh per linear inch and smaller silica particles through 50 mesh per linear inch, each in the proportions of between 40% and 60% by weight.

27. The method of making silica brick, which consists in vitrifying the silica, in crystallizing the vitrified silica, in grinding the crystallized silica into particles of different characteristics from those of the original particles and in forming into brick a mass of particles including crystallized particles.

28. The method of making silica brick, which consists in vitrifying silica, in allowing the vitrified silica to cool, in reheating it to an elevated temperature to develop crystalline material, in subsequently grinding the crystalline material and in forming the ground silica into brick.

RUSSELL PEARCE HEUER.